(12) United States Patent
Ramamurthy et al.

(10) Patent No.: US 9,615,126 B2
(45) Date of Patent: Apr. 4, 2017

(54) INTELLIGENT BUFFERING OF MEDIA STREAMS DELIVERED OVER INTERNET

(75) Inventors: Shailesh Ramamurthy, Bangalore, IN (US); Santosh Gondi, Bangalore, IN (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1447 days.

(21) Appl. No.: 13/168,410

(22) Filed: Jun. 24, 2011

(65) Prior Publication Data
US 2012/0331106 A1    Dec. 27, 2012

(51) Int. Cl.
*G06F 15/16* (2006.01)
*H04N 21/433* (2011.01)
(Continued)

(52) U.S. Cl.
CPC ..... *H04N 21/4331* (2013.01); *H04L 65/4084* (2013.01); *H04L 65/607* (2013.01);
(Continued)

(58) Field of Classification Search
USPC ....................................................... 709/218
See application file for complete search history.

(56) References Cited

U.S. PATENT DOCUMENTS 7,480,701 B2 *  1/2009  Smith et al. .................. 709/217
7,802,006 B2    9/2010  Bowra et al.
(Continued)

FOREIGN PATENT DOCUMENTS

WO    2010009188 A2    1/2010
WO    2010111261 A1    9/2010
(Continued)

OTHER PUBLICATIONS

Anindya Datta, Kaushik Dutta, Debra VanderMeer, Krithi Ramamritham, Shamkant B. Navathe, An architecture to support scalable online personalization on theWeb, Georgia Institute of Technology, University of Massachusetts, Indian Institute of Technology, Oct. 30, 2000, The VLDB Journal 10: 104-117 (2001) / Digital Object Identifier (DOI) 10.1007/s007780100037, Springer-Verlag 2001.
(Continued)

*Primary Examiner* — Richard G Keehn
(74) *Attorney, Agent, or Firm* — Lowenstein Sandler LLP

(57) ABSTRACT

A method and computing device for intelligently pre-buffering at access points in an adaptive or scalable stream to optimize trick-play support. The method receives a multimedia content stream from a multimedia content server as a series of segments, each segment including a key frame and corresponding to a predicted seek position in the multimedia content stream, where the multimedia content server delivers at least two versions of each segment, each version reconstructed from at least one encoded component of the multimedia content stream, the versions varying a characteristic of the multimedia content stream. The method determines a likelihood of receiving a seek request from a user to move from a current playout position to one of the predicted seek positions, and determines a size of a buffer for each version of each segment in the multimedia content stream based on the likelihood of receiving the seek request.

25 Claims, 5 Drawing Sheets

(51) Int. Cl.
*H04N 21/2343* (2011.01)
*H04N 21/44* (2011.01)
*H04N 21/6587* (2011.01)
*H04L 29/06* (2006.01)

(52) U.S. Cl.
CPC ......... *H04N 21/23439* (2013.01); *H04N 21/234327* (2013.01); *H04N 21/44004* (2013.01); *H04N 21/6587* (2013.01)

(56) References Cited

U.S. PATENT DOCUMENTS

| | | | |
|---|---|---|---|
| 2002/0047899 A1* | 4/2002 | Son et al. | 348/114 |
| 2004/0022094 A1* | 2/2004 | Radhakrishnan et al. | 365/200 |
| 2005/0060498 A1 | 3/2005 | Curtis | |
| 2006/0015699 A1 | 1/2006 | Fujiwara et al. | |
| 2007/0041444 A1* | 2/2007 | Gutierrez Novelo | 375/240.15 |
| 2008/0301315 A1* | 12/2008 | Cheng et al. | 709/231 |
| 2008/0310814 A1 | 12/2008 | Bowra et al. | |
| 2009/0292819 A1 | 11/2009 | Kandekar et al. | |
| 2009/0310669 A1* | 12/2009 | Konoshima | 375/240.01 |
| 2010/0271462 A1* | 10/2010 | Gutierrez Novelo | 348/43 |
| 2010/0271463 A1* | 10/2010 | Gutierrez Novelo | 348/43 |
| 2011/0292981 A1* | 12/2011 | Kihara et al. | 375/224 |
| 2012/0144444 A1* | 6/2012 | Hunt | 725/115 |
| 2012/0158802 A1* | 6/2012 | Lakshmanan et al. | 707/822 |
| 2012/0281572 A1* | 11/2012 | Lundin et al. | 370/252 |
| 2012/0320757 A1* | 12/2012 | Lohmar | 370/241 |
| 2013/0089265 A1* | 4/2013 | Yie et al. | 382/238 |

FOREIGN PATENT DOCUMENTS

| | | |
|---|---|---|
| WO | 2011/038034 A1 | 3/2011 |
| WO | 2011/070552 A1 | 6/2011 |

OTHER PUBLICATIONS

C. Umapathi, M. Aramuthan, and K. Raja, Enhancing Web Services Using Predictive Caching, Sathyabama University, P.K.Institute of Technology, Karaikal, Sep. 2011, vol. 1, No. 3, Sep. 2011, ISSN: 2046-6439.

PCT Search Report & Written Opinion, Re: Application #PCT/US2012/033033, Oct. 9, 2012.

C. Zheng, et al., "Distributed Prefetching Scheme for Random Seek Support in Peer-to-Peer Streaming Applications", ACM, Section 2.2, Figure 1, Nov. 11, 2005.

T. Schierl, et al., "Priority-Based Media Delivery Using SVC with RTP and HTTP Streaming", Multimedia Tools and Applications, Kluwer Academic Publishers, BO, vol. 55, No. 2, Section 3.1.2, pp. 227-246, Sep. 18, 2010.

* cited by examiner

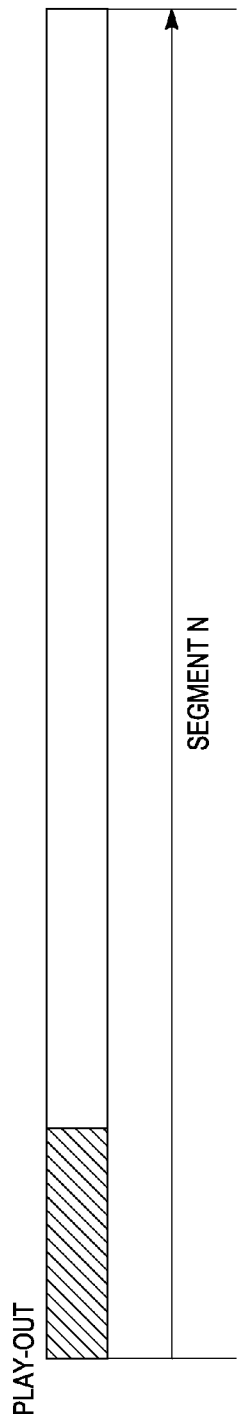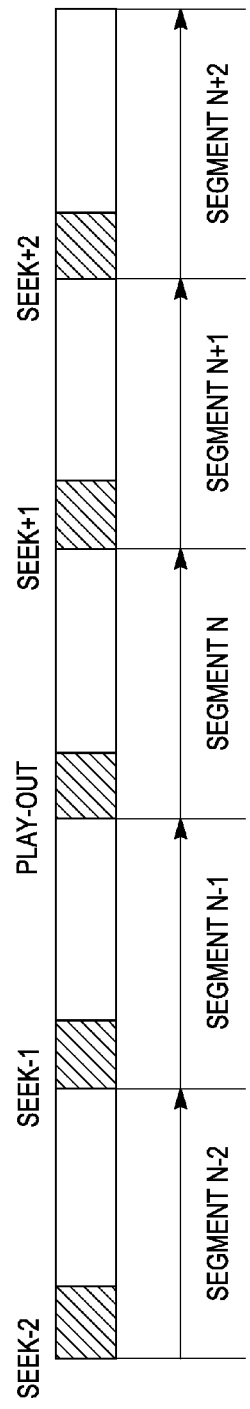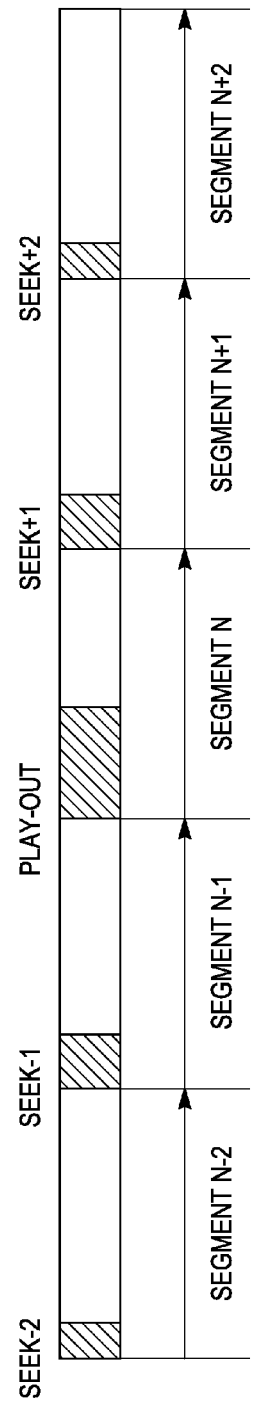

INTELLIGENT BUFFERING OF MEDIA STREAMS DELIVERED OVER INTERNET

BACKGROUND

The term over-the-top (OTT) service refers to a service from a third-party that a user of a network accesses via the network. These OTT services ride on top of the services that the user gets from the network operator, and have no business or technology affiliation with the network operator. For example, long distance telephone service is an OTT service for a user who obtains their long distance telephone service from a company that offers the long distance telephone service over a telephone network operated by another telephone company. Similarly, internet search engines and social networks are OTT services that provide value to the users of a network, but that are not owned or managed by the traditional network carriers.

Adaptive streaming is a process that adjusts the quality of a video stream based on changing network conditions to ensure the best possible viewing experience. Internet connection speeds vary widely, and the speed of each type of connection also varies depending on a wide variety of conditions. If a user connects to an Internet Service Provider (ISP) at 56 Kbps, that does not mean that 56 Kbps is available at all times. Bandwidth can vary, meaning that a 56 Kbps connection may decrease or increase based on current network conditions, causing video quality to fluctuate as well. Adaptive streaming adjusts the bitrate of the video to adapt to changing network conditions. Adaptive streaming includes hypertext transfer protocol (HTTP) live streaming (HLS), Smooth Streaming, WebM, and Motion Pictures Experts Group (MPEG) Dynamic Adaptive Streaming over HTTP (DASH). Adaptive streaming has many advantages for on-demand video playback and live events because it can reduce bandwidth expense and improve user experience by optimizing video quality based on network conditions.

In Scalable Video Coding (SVC), as well as JPEG2000 and Motion JPEG2000, the bitstream is scalable in multi-dimensions such as resolution (size), bitrate (quality), position, color-component and frame-rate (temporal scalability). As opposed to adaptive streaming, there is only one bitstream in a scalable coding scheme from which the right portions of interest can be extracted and processed further. In video content delivery systems, such as those that utilize adaptive streaming, and scalable coding, it is important to pre-buffer the media stream in such a way that a rich-media experience is provided to the user. The pre-buffering will allow the user to experience smooth trick-plays, granular random access, and use of the most suitable version of the bit stream for the network bandwidth, while also optimizing the buffer usage.

There is a need for a video content client device that intelligently pre-buffers at access points in an adaptive or scalable stream to optimize trick-play support. The presently disclosed invention satisfies this demand.

SUMMARY

Aspects of the present invention provide a method and computing device for intelligently pre-buffering at access points in an adaptive or scalable stream to optimize trick-play support. The method receives a multimedia content stream from a multimedia content server as a series of segments, each segment including a key frame and corresponding to a predicted seek position in the multimedia content stream, where the multimedia content server delivers at least two versions of each segment, each version reconstructed from at least one encoded component of the multimedia content stream, the versions varying a characteristic of the multimedia content stream. The method determines a likelihood of receiving a seek request from a user to move from a current playout position to one of the predicted seek positions, and determines a size of a buffer for each version of each segment in the multimedia content stream based on the likelihood of receiving the seek request.

BRIEF DESCRIPTION OF THE DRAWINGS

FIG. 3 is a schematic diagram that illustrates one embodiment of a prior art single segment multimedia content pre-buffering method.

FIG. 4 is a schematic diagram that illustrates one embodiment of a prior art multiple segment multimedia content pre-buffering method.

FIG. 5 is a schematic diagram that illustrates a multiple segment multimedia content pre-buffering method according to one embodiment of the present invention.

DETAILED DESCRIPTION

Figure 1:
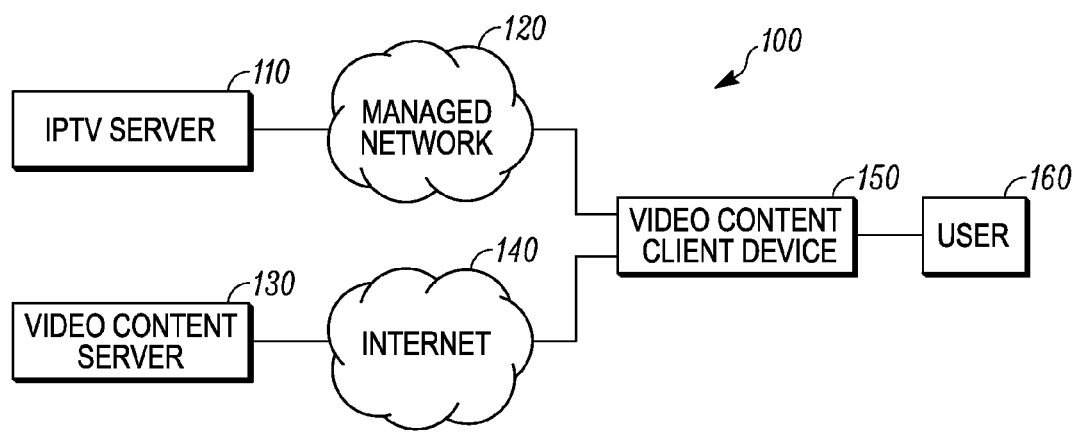
FIG. 1 is a network diagram that illustrates one embodiment of the hardware components of a system that performs the present invention.

FIG. 1 is a network diagram that illustrates one embodiment of the hardware components of a system that performs the present invention. A video content delivery system 100 includes an internet protocol television (IPTV) server 110, managed network 120, video content server 130, internet 140, video content client device 150, and a user 160. The IPTV server 110 and video content server 130 deliver multimedia content to the video content client device 150 via the managed network 120 and internet 140, respectively. In various embodiments, the video content server 130 includes services such as YouTube, Netflix, and Hulu, and OTT services. In various embodiments, the video content client device 150 includes a set-top box, mobile device, and personal computer client device. The video content delivery system 100 shown in FIG. 1 may include any number of interconnected IPTV servers 110, managed networks 120, video content servers 130, video content client devices 150, and users 160.

The managed network 120 and internet 140 shown in FIG. 1, in one embodiment, are communication networks. The present invention also contemplates the use of comparable network architectures including a LAN, a Personal Area Network (PAN) such as a Bluetooth network, a wireless LAN (e.g., a Wireless-Fidelity (Wi-Fi) network), peer-to-peer overlay network, and a Virtual Private Network (VPN).

The system also contemplates network architectures and protocols such as Ethernet, Internet Protocol, and Transmission Control Protocol.

The multimedia content delivered in the video content delivery system 100 shown in FIG. 1 includes, but is not limited to, transport mechanisms such as HTTP. One advantage of the HTTP transport mechanism is avoidance of firewall issues that associated with other transport mechanisms. In one embodiment, the multimedia content is delivered to the video content client device 150 as a single bitrate stream. One disadvantage associated with HTTP is streaming quality depends on the quality of the IP connection. Since content delivery may undergo stalling due to bandwidth fluctuations, it is difficult to use a single bitrate stream for live broadcasts and video-on-demand (VOD) delivery. Thus, various other embodiments, including adaptive streaming, live streaming, and scalable coding are available at the IPTV server 110 and video content server 130 to deliver multiple bitrate versions of the multimedia content.

When multiple bitrate versions, or multiple resolution versions, of the multimedia content are available, the video content client device 150 selects an appropriate version for decoding and rendering depending on the managed network 120, internet 140, and video content client device 150 resources that are available. Technologies that currently facilitate this selection include Internet Engineering Task Force (IETF)/Apple HTTP-Live-Streaming (HLS), Microsoft Silverlight Smooth Streaming, Google WebM, MPEG DASH, and Flash. For instance, HLS works with segmented TS-based video streams or files. Thus, the chosen container for HLS is an MPEG transport stream (TS) encapsulating MPEG-4 AVC (H.264) for video and AAC for audio. In each of these technologies, the multimedia content is typically chunked and made available to the video content client device 150 as relatively small files, typically on the order of 5 to 30 seconds. Some use cases may utilize larger chunks. The chunks from different bitrate versions streams can be synchronized to allow for switching between bitrate versions based on the throughput of the managed network 120 and internet 140 and video content client device 150 processing capabilities. An index file points to the chunk files that make-up the multimedia content. Each chunk is typically encoded and encrypted independently.

Scalable coding schemes such as scalable-video coding (SVC) or JPEG2000 or Motion JPEG2000 follow the paradigm of "Encode once, decode in many ways". The bitstream is scalable in multi-dimensions or characteristics, e.g., resolution (size), bitrate (quality), frame-rate, position, and color-component. As opposed to adaptive streaming, there is only one bitstream from which the right portions of interest can be extracted and processed further. This selection of portions of interest (targeted for specific use cases) can occur during encoding, decoding, or during transmission at a media-gateway in the managed network 120 or internet 140, or at the sending end.

Figure 2:
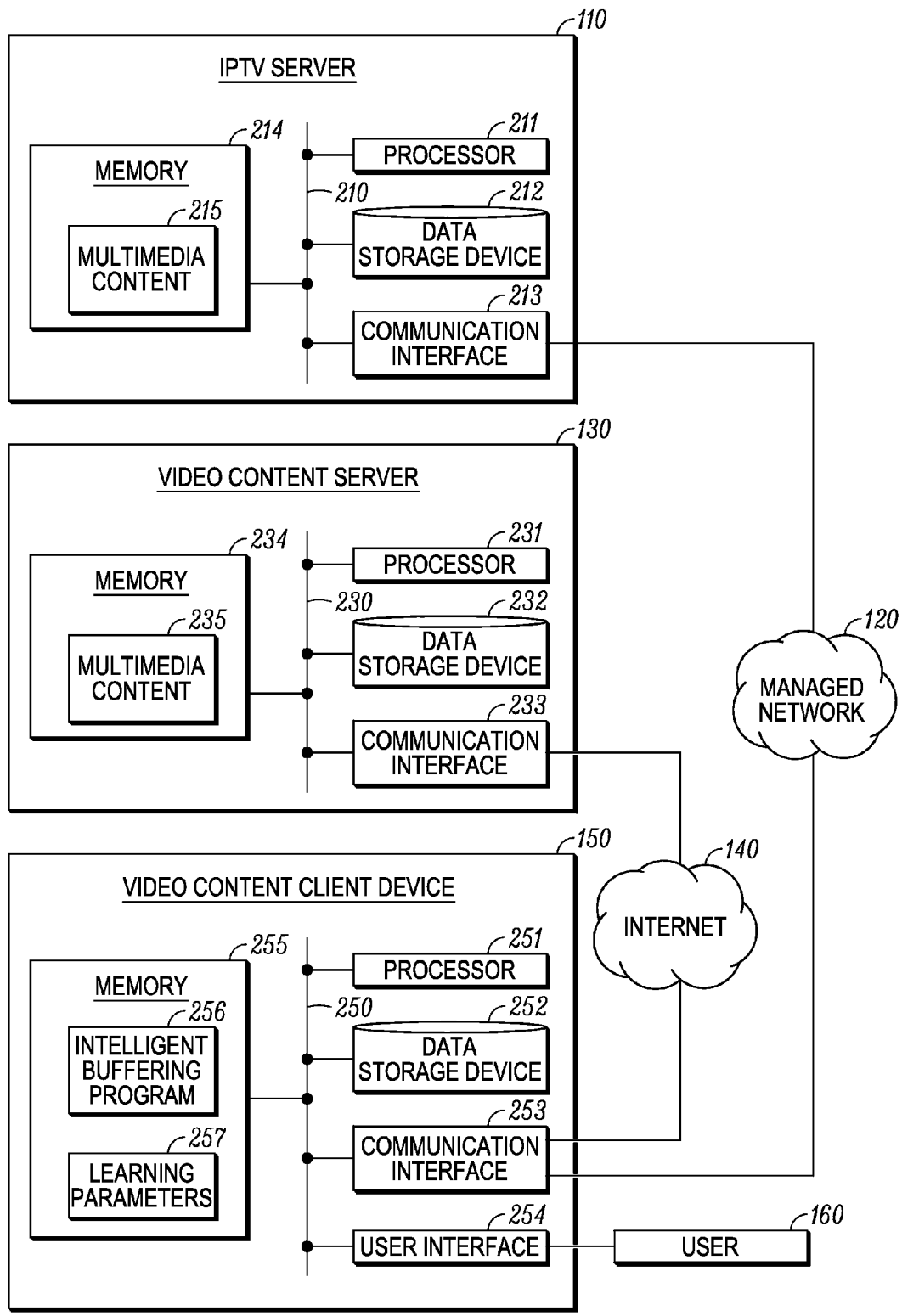
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the IPTV server 110, video content server 130, and video content client device 150 shown in FIG. 1.

The IPTV server 110, in one embodiment, is a general-purpose computing device that performs the present invention. A bus 210 is a communication medium that connects a processor 211, data storage device 212 (such as a Serial ATA (SATA) hard disk drive, optical drive, Small Computer System Interface (SCSI) disk, flash memory, storage located remotely in the internet cloud, or the like), communication interface 213, and memory 214 (such as Random Access Memory (RAM), Dynamic RAM (DRAM), non-volatile computer memory, flash memory, or the like). The communication interface 213 connects the IPTV server 110 to the managed network 120, and enables delivery of IPTV content via the managed network 120.

The processor 211 performs the disclosed methods by executing the sequences of operational instructions that comprise each computer program resident in, or operative on, the memory 214. The reader should understand that the memory 214 may include operating system, administrative, and database programs that support the programs disclosed in this application. In one embodiment, the configuration of the memory 214 of the IPTV server 110 includes multimedia content 215 that enables performance of the methods of the present invention disclosed in detail in FIG. 3. When the processor 211 performs the disclosed methods, it stores intermediate results in the memory 214 or data storage device 212. In another embodiment, the memory 214 may swap programs, or portions thereof, in and out of the memory 214 as needed, and thus may include fewer than all of these programs at any one time.

The video content server 130, in one embodiment, is a general-purpose computing device that performs the present invention. A bus 230 is a communication medium that connects a processor 231, data storage device 232 (such as a Serial ATA (SATA) hard disk drive, optical drive, Small Computer System Interface (SCSI) disk, flash memory, storage located remotely in the internet cloud, or the like), communication interface 233, and memory 234 (such as Random Access Memory (RAM), Dynamic RAM (DRAM), non-volatile computer memory, flash memory, or the like). The communication interface 233 connects the video content server 130 to the internet 140, and enables delivery of video content via the internet 140.

The processor 231 performs the disclosed methods by executing the sequences of operational instructions that comprise each computer program resident in, or operative on, the memory 234. The reader should understand that the memory 234 may include operating system, administrative, and database programs that support the programs disclosed in this application. In one embodiment, the configuration of the memory 234 of the video content server 130 includes multimedia content 235 that enables performance of the methods of the present invention disclosed in detail in FIG. 3. When the processor 231 performs the disclosed methods, it stores intermediate results in the memory 234 or data storage device 232. In another embodiment, the memory 234 may swap programs, or portions thereof, in and out of the memory 234 as needed, and thus may include fewer than all of these programs at any one time.

The video content client device 150, in one embodiment, is a general-purpose computing device that performs the present invention. A bus 250 is a communication medium that connects a processor 251, data storage device 252 (such as a Serial ATA (SATA) hard disk drive, optical drive, Small Computer System Interface (SCSI) disk, flash memory, storage located remotely in the internet cloud, or the like), communication interface 253, user interface 254, and memory 255 (such as Random Access Memory (RAM), Dynamic RAM (DRAM), non-volatile computer memory, flash memory, or the like). The communication interface 253 connects the video content client device 150 to the managed network 120 and the internet 140. The user interface 254 connects the video content client device 150 to a user 160. In various embodiments, the user interface 254 is a radiofrequency (RF) remote controller, and a keypad. In one embodiment, the implementation of the present invention on the video content client device 150 is an application-specific integrated circuit (ASIC).

The processor 251 performs the disclosed methods by executing the sequences of operational instructions that comprise each computer program resident in, or operative on, the memory 255. The reader should understand that the memory 255 may include operating system, administrative, and database programs that support the programs disclosed in this application. In one embodiment, the configuration of the memory 255 of the video content client device 150 includes an intelligent buffering program 256 and learning parameters 257 that perform the methods of the present invention disclosed in detail in FIG. 5, FIG. 6, FIG. 7, FIG. 8, and FIG. 9. When the processor 251 performs the disclosed methods, it stores intermediate results in the memory 255 or data storage device 252. In another embodiment, the memory 255 may swap programs, or portions thereof, in and out of the memory 255 as needed, and thus may include fewer than all of these programs at any one time.

Efficient implementations of multimedia content players will pre-buffer multimedia content streams so that playback from a point within the pre-buffered portion begins with minimal lag. Such pre-buffering is useful for reducing playback latencies especially for operations such as seek or random-access operations in the multimedia content stream, and fast-playback modes (e.g., playback at two-times normal speed). The multimedia content stream includes a number of frames. The "key-frames" are the frames that can be independently decoded, without reference to other frames (e.g., intra frames in MPEG-4 Visual, and IDR frames in H.264). The key frames are important when implementing random-access and trick-play operations.

FIG. 3 is a schematic diagram that illustrates one embodiment of a prior art single segment multimedia content pre-buffering method. The prior art implements pre-buffering of a single segment from the playout position onward as shown in FIG. 3. The shaded region indicates the accumulation of data in a buffer over a period of time. As time progresses, the amount of data buffered may increase until a desired amount is reached. An example of such pre-buffering can be found in a video content client device 150 that views a video on an internet 140 video sites such as YouTube, where the entire media stream is progressively pre-buffered. When the video content client device 150 is an embedded device with limited resources, it cannot perform pre-buffering of the entire clip length.

FIG. 4 is a schematic diagram that illustrates one embodiment of a prior art multiple segment multimedia content pre-buffering method. In segmented pre-buffering, the buffered segments are discontinuous, where each buffered segment corresponds to the beginning of a segment in the multimedia content stream. A multimedia content player plays the multimedia content stream from the playout position shown in FIG. 4. The shaded regions indicate the accumulation of data in a buffer associated with the playout position and each possible seek position (SEEK −2, SEEK −1, SEEK +1, and SEEK +2). In such a prior art system, if a user 160 seeks to a position in the multimedia content stream that does not align with a segment boundary, the system has to flush the currently pre-buffered data and begin the pre-buffering process. The present invention builds upon the concept of segmented buffering as shown in FIG. 4 by aligning each buffer to start at a key-frame in the multimedia content stream. This will enable a user 160 to seek to a point far-removed from the current playout position.

FIG. 5 is a schematic diagram that illustrates a multiple segment multimedia content pre-buffering method according to one embodiment of the present invention. As shown in FIG. 5, the intelligent selection of pre-buffering segments can be based on several considerations that improve upon the simple prior art strategy of pre-buffering equal segment lengths starting from each key frame, or from each selected key frame. Weighting based on access-likelihood can improve the benefits of pre-buffering. As a simple example, if the size of the buffer is the amount of buffered content, it would be expedient to pre-buffer more bytes (accounting for larger time-units worth of data) in the segment that starts out from the current playout position, and fewer bytes in segments far-removed from the current playout position (i.e., the time duration between the current playout position and the seek position). This is based on the usage pattern assumption that random-access seeks or trick-plays would be more probable in regions closer to the current playout position.

The strategy shown in FIG. 5 can be adapted further as a learning engine that collects how a user accesses the stream over a period of time to predict how the user will likely access the stream in the future. To illustrate this, some users may typically playout content linearly. Another user may regularly randomly access the content in a forward direction, to look-ahead in the content. Yet another user may regularly replay parts of content that have already been played or skimmed. The present invention maintains a historical log of access to the stream for each user-profile to support the learning engine.

The segmented pre-buffering shown in FIG. 5 can also be extended to adaptive bit-streams and scalable streams, wherein multiple versions of the same content that vary a characteristic of the content (e.g., bitrates), are made available to the video content client device 150 as needed. Scalable streams typically do not store multiple encoded versions as separate streams, enhancement versions are deltas (i.e., differential components) over a base version. Thus, each encoded version of a scalable stream is reconstructed from encoded components of the stream, where each encoded component varies a characteristic of the stream.

Figure 6:
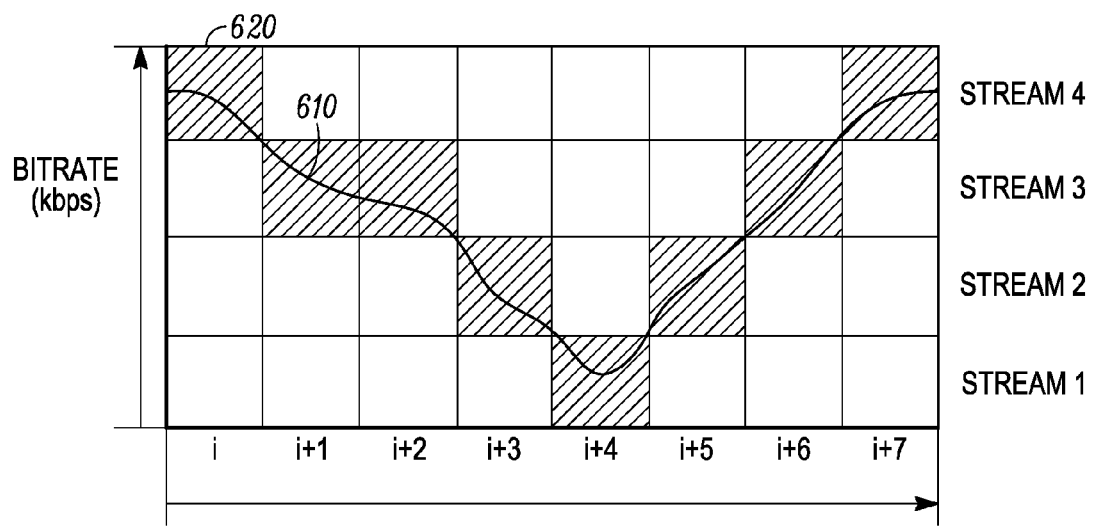
FIG. 6 is a network bandwidth chart that illustrates an adaptive chunked multimedia content pre-buffering method according to one embodiment of the present invention.

FIG. 6 is a network bandwidth chart that illustrates an adaptive chunked multimedia content pre-buffering method according to one embodiment of the present invention. Each row in the chart (STREAM 1, STREAM 2, STREAM 3, and STREAM 4) illustrates an adaptive stream at a given bitrate, where each stream comprises eight chunks (i, i+1, i+2, i+3, i+4, i+5, i+6, and i+7) that are available over a given period of time. STREAM 1 has the lowest bitrate, STREAM 2 has the second lowest bitrate, STREAM 3 has the third lowest bitrate, and STREAM 4 has the highest bitrate. The network bandwidth chart also shows the change in the available network bandwidth 610 over time. The system examines the available network bandwidth 610 and selects the chuck for that time period from the appropriate stream. As shown in FIG. 6, since the available network bandwidth 610 is high at time i, the system selects the chuck 620 from STREAM 4. At time i+1 and i+2, since the available network bandwidth 610 has dropped, the system selects the chuck from STREAM 3. At time i+3, since the available network bandwidth 610 has dropped, the system selects the chuck from STREAM 2. At time i+4, since the available network bandwidth 610 has dropped, the system selects the chuck from STREAM 1. At time i+5, since the available network bandwidth 610 has increased, the system selects the chuck from STREAM 2. At time i+6, since the available network bandwidth 610 has increased, the system selects the chuck from STREAM 3. At time i+7, since the available network bandwidth 610 has increased, the system selects the chuck from STREAM 4.

Figure 7:
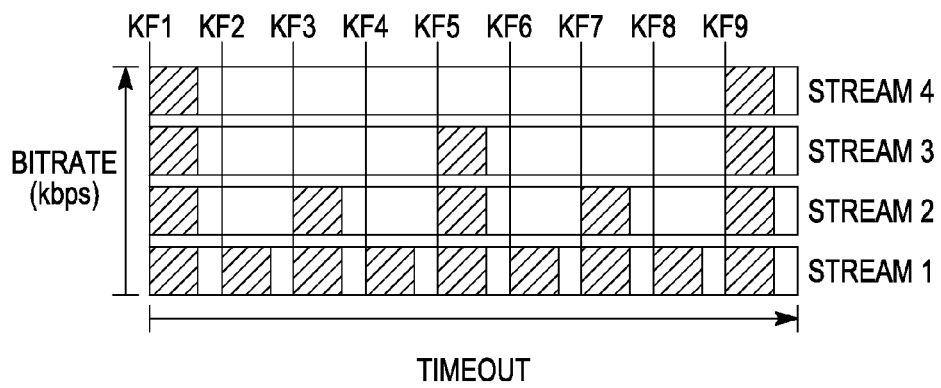
FIG. 7 is a schematic diagram that illustrates a successive selection pre-buffering method based on bitrate according to one embodiment of the present invention.

FIG. 7 is a schematic diagram that illustrates a successive selection pre-buffering method based on bitrate according to one embodiment of the present invention. In one embodiment, pre-buffering of adaptive streams is based on a multi-level or successive approximation strategy in which selection is based on bitrate. In this strategy, the stream with the lowest bitrate (STREAM 1) is buffered most frequently, the stream with the second lowest bitrate (STREAM 2) is buffered less frequently, the stream with the third lowest bitrate (STREAM 3) is buffered even less frequently, and the stream with the highest bitrate (STREAM 4) is buffered least frequently. In one embodiment, STREAM 1 is buffered at every key frame (KF1, KF2, KF3, KF4, KF5, KF6, KF7, KF8, and KF9), STREAM 2 is buffered at every other key frame (KF1, KF3, KF5, KF7, and KF9), STREAM 3 is buffered at every fourth key frame (KF1, KF4, and KF9), and STREAM 4 is buffered at every eighth key frame (KF1 and KF9). Since low bitrate streams consume less buffer space than high bitrate streams, buffering the low bitrate streams more frequently is not an overly excessive use of buffer space. Also, when a user 160 randomly accesses the stream via a seek, if the target bitrate chunk (i.e., the bitrate associated with the available network bandwidth 610) at that seek point is already pre-buffered and available, the target bitrate version of the stream is presented. If the target bitrate chunk is not available for that seek point, the user 160 can quickly be presented the next highest bitrate version of a chunk starting from the seek point, even as the target bitrate chunk (i.e., the bitrate associated with the available network bandwidth 610) starts in parallel with getting buffered from the seek point and immediately successive segments beyond. In this approach, for the chunk duration, the user may be presented with a quality that is lower than what the instantaneous bandwidth affords. Beyond the chunk, the pre-buffering of the target bitrate version is kept ready. This trade-off is to minimize the latency. In the worst case, the lowest bitrate version is always available, if buffered from every seek point, it could be argued that if the instantaneous network bandwidth is high enough, the latency in presentation of the target bitrate chunk may be acceptable perceptually. Hence, this approach (to present a quality that is lower than what the instantaneous bandwidth affords, in the interest of latency) could be conditionally gated by a threshold which decides if the available network bandwidth would induce latencies in presentation and hence requires presentation of pre-buffered lower bitrate versions. The threshold depends on whether the latency induced by the available network bandwidth (and presentation-unit size) is perceptually objectionable. In one embodiment, an adaptive streaming client starts from the lowest bitrate version of adaptive stream to minimize the latency incurred when starting the playout. Also, so that sudden changes in quality do not cause discontinuities in the viewed content, this embodiment progresses gradually through all the interim bitrate versions, until the bitrate afforded by the current network bandwidth. If network bandwidth drops, the strategy typically is different in that the bitrate version closest to, and lesser than the network bandwidth, is immediately transitioned to, without stepping down gradually. Additional considerations in buffering can optimize the latency incurred in playing out from a position that has no pre-buffered data.

Figure 8:
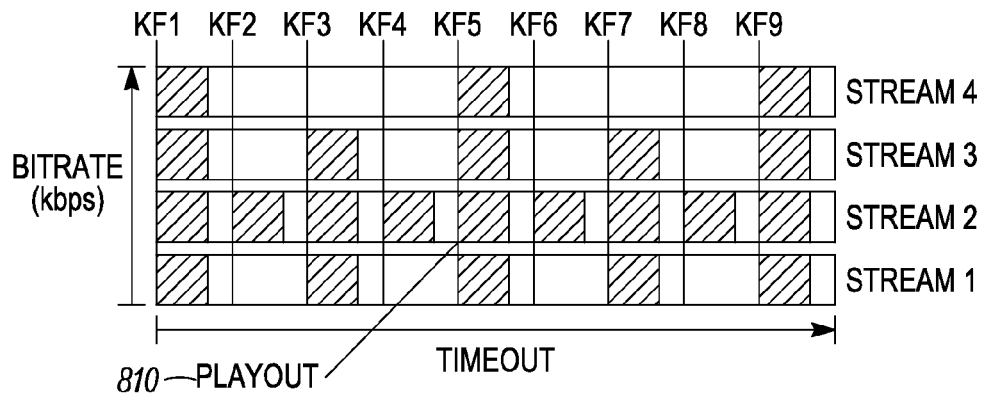
FIG. 8 is a schematic diagram that illustrates a successive selection pre-buffering method based on priority according to one embodiment of the present invention.

FIG. 8 is a schematic diagram that illustrates a successive selection pre-buffering method based on priority according to one embodiment of the present invention. In one embodiment, pre-buffering of adaptive streams is based on according a higher priority to the current stream being played. Assuming that the available network bandwidth 610 has a higher probability to remain constant or only vary gradually, rather than exhibiting instantaneously sudden changes, this strategy buffers more frequently for the current stream being played, and less frequently for other bitrate streams. In one embodiment, the method buffers segments that start from every key frame of the bitrate version of stream currently being played. Bitrates that are "farther away" from the current played-out-stream's bitrate can be buffered less frequently in a successive manner. As shown in FIG. 8, the current playout position 810 is at key frame KF5 in STREAM 2. If the available network bandwidth 610 remains constant, it is more likely that the user seeks within STREAM 2, hence STREAM 2 is buffered with more frequently by buffering at the start of every key frame (KF1, KF2, KF3, KF4, KF5, KF6, KF7, and KF8). The bitrate streams proximate to the bitrate of the current stream are STREAM 1 and STREAM 3, hence STREAM 1 and STREAM 3 are buffered less frequently than STREAM 2. FIG. 8 shows a dyadic sub-sampling whereby every alternate key frame of the key frames buffered for STREAM 2 are buffered for STREAM 1 and STREAM 3 (KF1, KF3, KF5, KF7, and KF9). Since the bitrate for STREAM 4 is farthest from the bitrate of the stream currently being played, STREAM 4 is buffered least frequently (KF1, KF5, and KF9).

This strategy illustrated in FIG. 8 can also be applied in the domain of resolution. Resolutions (sizes) which are "farther away" from the resolution of the stream currently being current played can be buffered less frequently in a successive manner. In one embodiment, a mobile device that consumes 640×480 resolution media is unlikely or less likely to need segments of a high definition (HD) stream.

Scalable coding schemes such as scalable-video coding (SVC, built upon H.264 as its base-layer), as well as JPEG2000 or Motion JPEG2000 follow the paradigm of "encode once, decode in many ways". The bitstream is scalable in multi-dimensions or characteristics (e.g., resolution (size), bitrate (quality), frame-rate, position, and color-component). As opposed to adaptive streaming, there is only one bitstream from which the right portions of interest can be extracted and processed further. This selection of portions of interest (targeted for specific use cases) can occur at decoder, or at a media-gateway in network, or at the sending end. Scalable coding is a forward-looking technology that may not be widely deployed at present but is envisioned to find wide prevalence. In one embodiment of adaptive streaming, each bitrate version of the content constitutes one encoded component. In another embodiment of scalable technologies such as JPEG2000 as well as SVC, each encoded component comprises of one or more of a specific resolution (size), a specific quality layer, a specific frame-rate, a specific position, and a specific color-component.

The strategies described above and illustrated in FIG. 6, FIG. 7, and FIG. 8, are applicable to scalable schemes. The multi-level paradigm described for adaptive streaming can also be applied to scalable streams. In one embodiment, the segments of the current bitrate or the current resolution can be given more weight for buffering, in accordance to the earlier figures depicting a distance weighted multi-level buffering.

Figure 9:
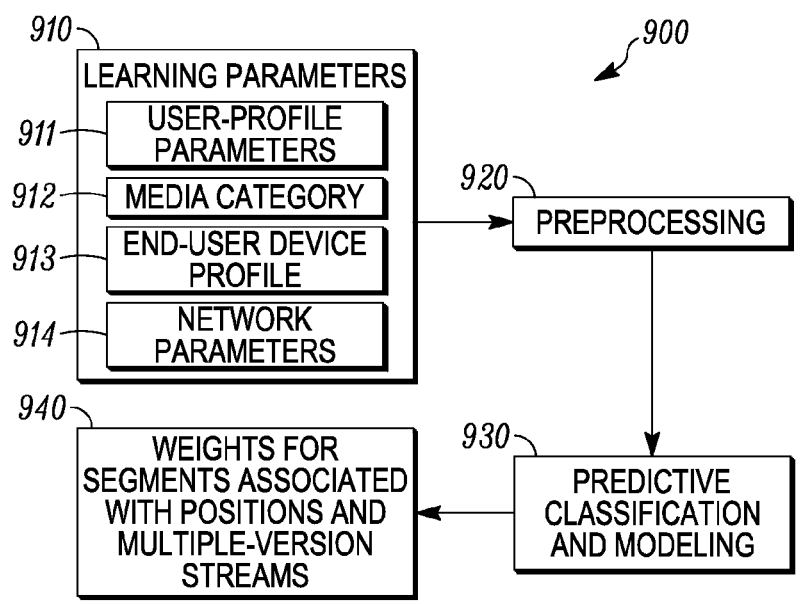
FIG. 9 is a flow diagram that illustrates a successive selection pre-buffering method based on a learning model according to one embodiment of the present invention.

FIG. 9 is a flow diagram that illustrates a successive selection pre-buffering method based on a learning model according to one embodiment of the present invention. As shown in FIG. 9, the stream selection can also be based on a learning or heuristic model 900. The buffering can be determined based on intelligently learning, and adapting, to one or more objective learning parameters 910, including user-profile parameters 911, media category 912, end-user device profile 913, acceptable latency of playout from a start of the content stream or one of the seek positions, and network parameters 914. This approach typically includes an offline learning phase to train the model, followed by an online field-deployment phase. While the previously described strategies can be realized in low-complexity, an intelligent learning approach involves relatively moderate to high complexity (based on the training algorithm) for the learning phase followed by low complexity for the field-deployment phase.

The user-profile parameters 911 detect patterns in how a user 160 accesses the content that they view. Some users may prefer to view content linearly from start to finish. Other users may prefer to quickly sample the content randomly or "channel surf". Still other users may prefer to playback portions of the content that they viewed earlier. The user-profile parameters 911 may include time or byte offsets of each of the user's access to the content, or a log of all the trick plays (e.g., fast-forward, reverse, pause, etc.) that the user requested.

The media category 912 detect patterns in the category of the content that a user 160 accesses. If a stream is a sporting event, such as a cricket match, the stream would have a number of replays associated with significant portions of the sporting event, such as a boundary, catch, and clean bowled. The media category 912 may include sporting event clips having highlight portions, movies, and news.

The end-user device profile 913 detect characteristics in the end-user device that affect the content that a user 160 accesses. Since each end-user device has a target resolution and bitrate, the buffering scheme gives more weight to the preferred resolution and bitrate. For example, when the end-user device is a mobile device, there is no need to buffer a high-definition (HD) stream. The end-user device profile 913 may include an HD display, mobile device, or personal computer.

The network parameters 914 detect characteristics in the network performance that affect the content that a user 160 accesses. Since the video content client device 150 can switch to a different bitrate version of a stream based on the available network bandwidth 610, a regression analysis of network bandwidth data that includes past and present usage may be useful to predict future changes in network bandwidth. The network parameters 914 may include time-series network bandwidth (i.e., data samples of network bandwidth variation over time).

The learning model 900 shown in FIG. 9 inputs the learning parameters 910 to a preprocessing 920 module that performs sampling, dimensionality reduction by principal component analysis, and other preprocessing. The output of the preprocessing 920 module is input to a predictive classification and modeling 930 module that includes learning by algorithms such as decision trees, Bayesian/statistical classification, neural networks, fuzzy logic, and genetic algorithms. The output of the predictive classification and modeling 930 are the weights for segments associated with positions and multiple-version streams 940.

Although the disclosed embodiments describe a fully functioning method and computing device for intelligently pre-buffering at access points in an adaptive or scalable stream to optimize trick-play support, the reader should understand that other equivalent embodiments exist. Since numerous modifications and variations will occur to those reviewing this disclosure, the method and system for intelligently pre-buffering at access points in an adaptive or scalable stream to optimize trick-play support is not limited to the exact construction and operation illustrated and disclosed. Accordingly, this disclosure intends all suitable modifications and equivalents to fall within the scope of the claims.

We claim:

1. A method, comprising:
 receiving a multimedia content stream from a multimedia content server, the multimedia content stream comprising a series of segments, each segment including a key frame and corresponding to a predicted seek position in the multimedia content stream, the multimedia content server delivering at least two versions of each segment in the multimedia content stream, each version reconstructed from at least one encoded component of the multimedia content stream, the versions varying a characteristic of the multimedia content stream;
 determining a likelihood of receiving a seek request from a user to move from a current playout position in the multimedia content stream to one of the predicted seek positions in the multimedia content stream; and
 determining a size of a buffer for each version of each segment in the multimedia content stream based on the likelihood of receiving the seek request.

2. The method of claim 1, wherein the multimedia content stream is an adaptive stream.

3. The method of claim 1, wherein the multimedia content stream is a scalable coding stream.

4. The method of claim 1, wherein the versions of each segment vary at least one of a bitrate, resolution, frame-rate, position, and color-component of the multimedia content stream.

5. The method of claim 1, wherein the determining of the likelihood of receiving the seek request further comprises:
 determining a time duration between the current playout position and the predicted seek position,
 wherein the likelihood of receiving the seek request decreases as the time duration increases.

6. The method of claim 1, wherein the determining of the likelihood of receiving the seek request further comprises:
 collecting a history of access to the multimedia content stream by the user over a period of time,
 wherein the likelihood of receiving the seek request increases when receipt of the seek request is consistent with the history of access to the multimedia content stream by the user.

7. The method of claim 1, wherein when the characteristic that the versions vary is a bitrate, the determining of the size of the buffer for each version of each segment further comprises:
 determining a closeness between the bitrate of the multimedia content stream currently being played-out and the bitrate of the predicted seek position,
 wherein the size of the buffer increases when the bitrate of the predicted seek position becomes closer to the bitrate of the multimedia content stream currently being played-out, the size of the buffer being greatest when the bitrate of the predicted seek position equals the bitrate of the multimedia content stream currently being played-out.

8. The method of claim 1, wherein when the characteristic that the versions vary is a bitrate, the determining of the size of the buffer for each version of each segment further comprises:

determining a priority ordering of the versions for each segment in the multimedia content stream,
wherein the size of the buffer increases for higher-priority versions, the size of the buffer being greatest for the highest-priority version.

9. The method of claim 1, wherein when the characteristic that the versions vary is a bitrate, the determining of the size of the buffer for each version of each segment further comprises:
determining a closeness between the bitrate of the multimedia content stream currently being played-out and the bitrate of the predicted seek position,
wherein the size of the buffer increases when the bitrate of the predicted seek position becomes closer to, and is lesser than, an available network bandwidth associated with the current playout position in the multimedia content stream, the size of the buffer being greatest when the bitrate of the predicted seek position is closest to, and lesser than, the available network bandwidth.

10. The method of claim 1, wherein when the characteristic that the versions vary is a bitrate, the determining of the size of the buffer for each version of each segment further comprises:
determining an available network bandwidth associated with the current playout position in the multimedia content stream,
wherein the size of the buffer is determined to minimize a predicted latency time to start playout from the predicted seek position.

11. The method of claim 1, wherein when the characteristic that the versions vary is a resolution, the determining of the size of the buffer for each version of each segment further comprises:
determining a closeness between the resolution of the multimedia content stream currently being played-out and the resolution of the predicted seek position,
wherein the size of the buffer increases when the resolution of the predicted seek position becomes closer to the resolution of the multimedia content stream currently being played-out, the size of the buffer being greatest when the resolution of the predicted seek position equals the resolution of the multimedia content stream currently being played-out.

12. The method of claim 1, wherein the determining of the likelihood of receiving the seek request further comprises:
collecting learning parameters, including at least one of user-profile parameters, media category, end-user device profile, acceptable latency of playout from a start of multimedia content stream or one of the predicted seek positions, and network parameters; and
calculating a weight for determining the size of the buffer for each encoded version of each segment in the multimedia content stream, the weight based on predictive classification and modeling of the learning parameters.

13. The method of claim 1, further comprising:
aligning each buffer to start at the key frame of each segment in the multimedia content stream.

14. A computing device, comprising:
a memory device resident in the computing device; and
a processor disposed in communication with the memory device, the processor configured to:
receive a multimedia content stream from a multimedia content server, the multimedia content stream comprising a series of segments, each segment including a key frame and corresponding to a predicted seek position in the multimedia content stream, the multimedia content server delivering at least two versions of each segment in the multimedia content stream, each version reconstructed from at least one encoded component of the multimedia content stream, the versions varying a characteristic of the multimedia content stream;
determine a likelihood of receiving a seek request from a user to move from a current playout position in the multimedia content stream to one of the predicted seek positions in the multimedia content stream; and
determine a size of a buffer for each version of each segment in the multimedia content stream based on the likelihood of receiving the seek request.

15. The computing device of claim 14, wherein to determine the likelihood of receiving the seek request, the processor is further configured to:
determine a time duration between the current playout position and the predicted seek position,
wherein the likelihood of receiving the seek request decreases as the time duration increases.

16. The computing device of claim 14, wherein to determine the likelihood of receiving the seek request, the processor is further configured to:
collect a history of access to the multimedia content stream by the user over a period of time,
wherein the likelihood of receiving the seek request increases when receipt of the seek request is consistent with the history of access to the multimedia content stream by the user.

17. The computing device of claim 14, wherein when the characteristic that the versions vary is a bitrate, to determine the size of the buffer for each version of each segment, the processor is further configured to:
determine a closeness between the bitrate of the multimedia content stream currently being played-out and the bitrate of the predicted seek position,
wherein the size of the buffer increases when the bitrate of the predicted seek position becomes closer to the bitrate of the multimedia content stream currently being played-out, the size of the buffer being greatest when the bitrate of the predicted seek position equals the bitrate of the multimedia content stream currently being played-out.

18. The computing device of claim 14, wherein when the characteristic that the versions vary is a bitrate, to determine the size of the buffer for each version of each segment, the processor is further configured to:
determine a priority ordering of the versions for each segment in the multimedia content stream,
wherein the size of the buffer increases for higher-priority versions, the size of the buffer being greatest for the highest-priority version.

19. The computing device of claim 14, wherein when the characteristic that the versions vary is a bitrate, to determine the size of the buffer for each version of each segment, the processor is further configured to:
determine a closeness between the bitrate of the multimedia content stream currently being played-out and the bitrate of the predicted seek position,
wherein the size of the buffer increases when the bitrate of the predicted seek position becomes closer to, and is lesser than, an available network bandwidth associated with the current playout position in the multimedia content stream, the size of the buffer being greatest when the bitrate of the predicted seek position is closest to, and lesser than, the available network bandwidth.

20. The computing device of claim 14, wherein when the characteristic that the versions vary is a bitrate, to determine the size of the buffer for each version of each segment, the processor is further configured to:
  determine an available network bandwidth associated with the current playout position in the multimedia content stream,
  wherein the size of the buffer is determined to minimize a predicted latency time to start playout from the predicted seek position.

21. The computing device of claim 14, wherein when the characteristic that the versions vary is a resolution, to determine the size of the buffer for each version of each segment, the processor is further configured to:
  determining a closeness between the resolution of the multimedia content stream currently being played-out and the resolution of the predicted seek position,
  wherein the size of the buffer increases when the resolution of the predicted seek position becomes closer to the resolution of the multimedia content stream currently being played-out, the size of the buffer being greatest when the resolution of the predicted seek position equals the resolution of the multimedia content stream currently being played-out.

22. The computing device of claim 14, wherein to determine the likelihood of receiving the seek request, the processor is further configured to:
  collect learning parameters, including at least one of user-profile parameters, media category, end-user device profile, acceptable latency of playout from a start of multimedia content stream or one of the predicted seek positions, and network parameters; and
  calculate a weight for determining the size of the buffer for each encoded version of each segment in the multimedia content stream, the weight based on predictive classification and modeling of the learning parameters.

23. The computing device of claim 14, wherein the processor is further configured to align each buffer to start at the key frame of each segment in the multimedia content stream.

24. A non-transitory computer-readable medium, comprising computer-executable instructions that, when executed on a computing device, perform steps of:
  receiving a multimedia content stream from a multimedia content server, the multimedia content stream comprising a series of segments, each segment including a key frame and corresponding to a predicted seek position in the multimedia content stream, the multimedia content server delivering at least two versions of each segment in the multimedia content stream, each version reconstructed from at least one encoded component of the multimedia content stream, the versions varying a characteristic of the multimedia content stream;
  determining a likelihood of receiving a seek request from a user to move from a current playout position in the multimedia content stream to one of the predicted seek positions in the multimedia content stream; and
  determining a size of a buffer for each version of each segment in the multimedia content stream based on the likelihood of receiving the seek request.

25. The non-transitory computer-readable medium of claim 24, wherein the computer instructions further perform aligning each buffer to start at the key frame of each segment in the multimedia content stream.

* * * * *